Patented July 7, 1953

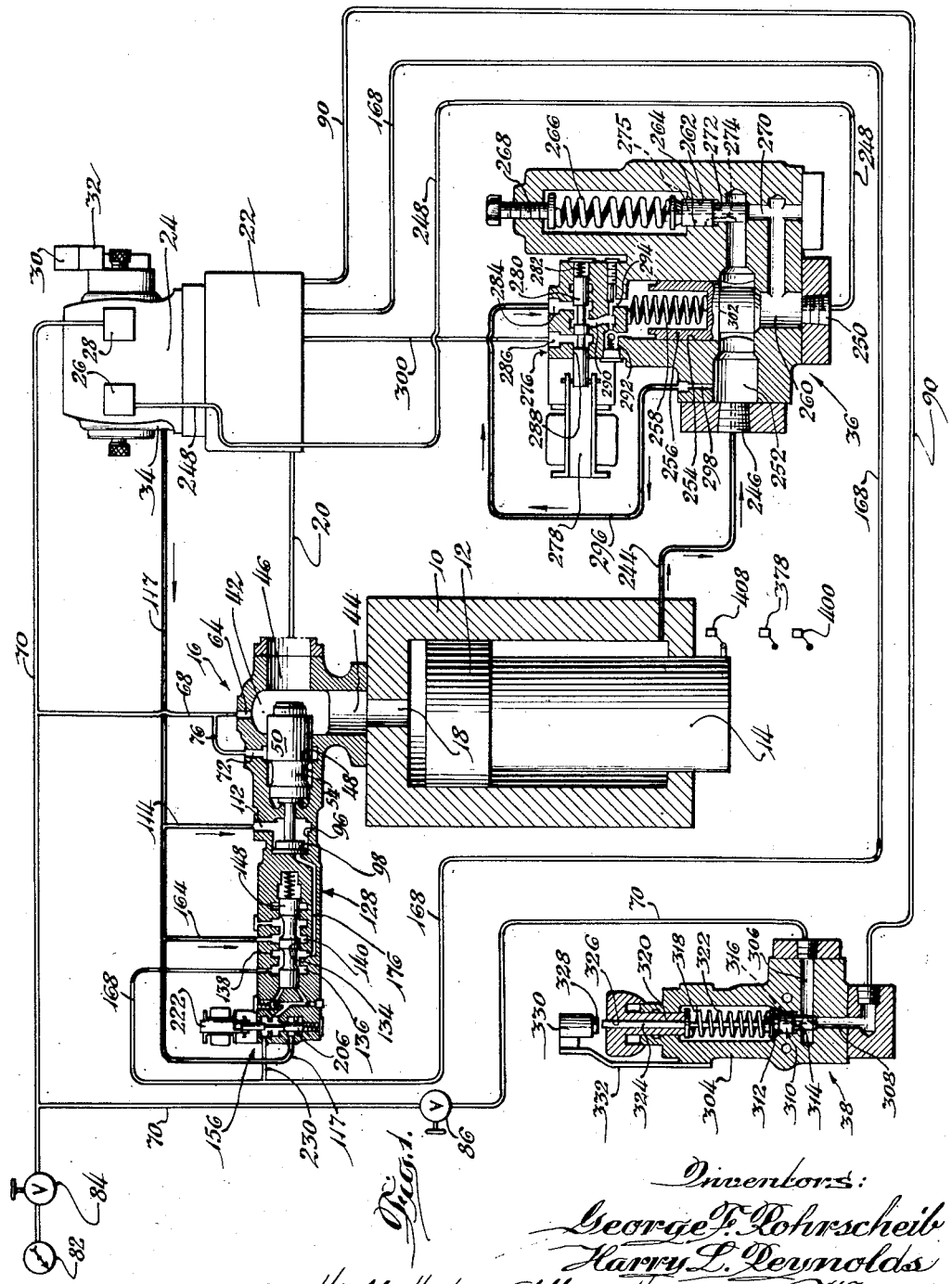

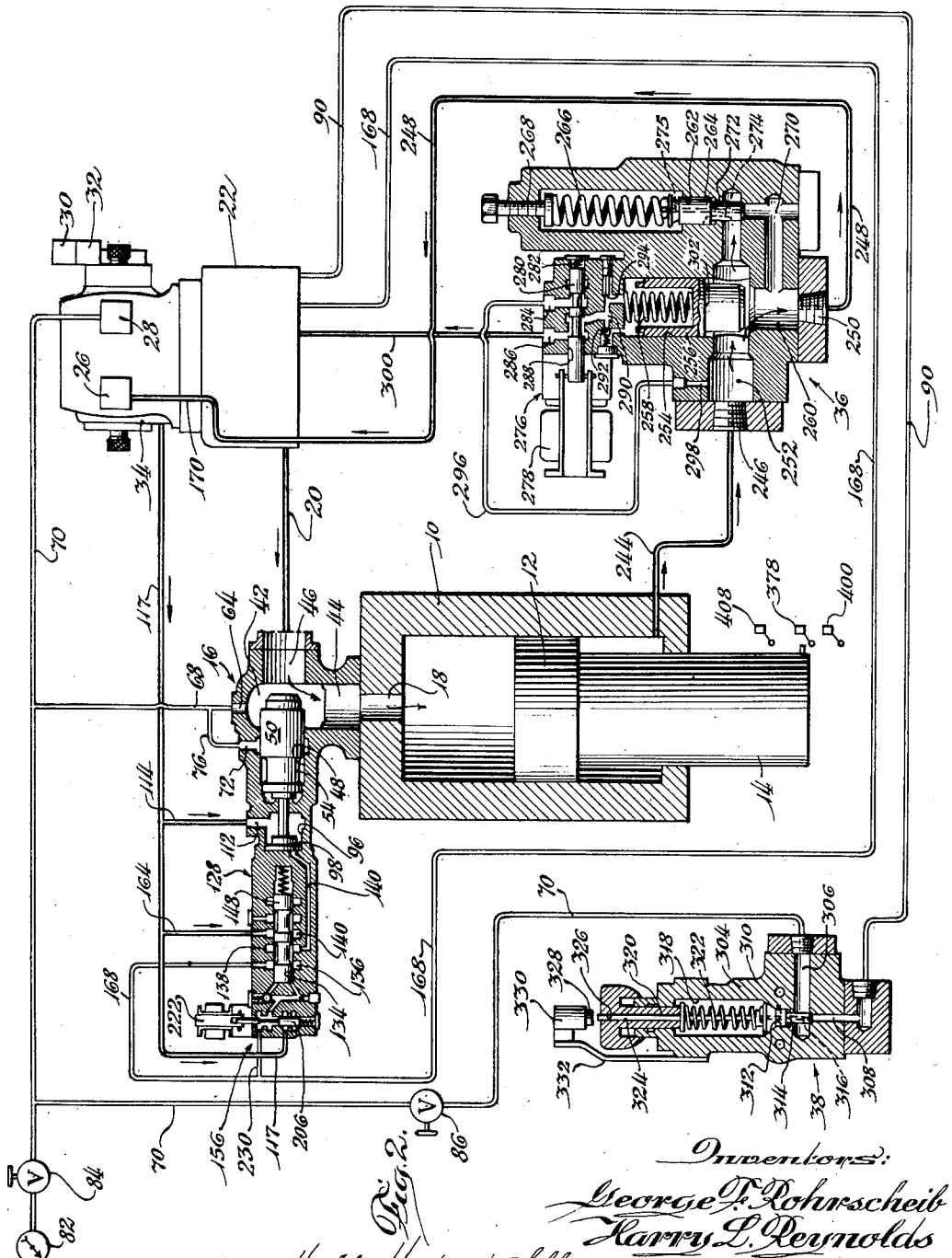

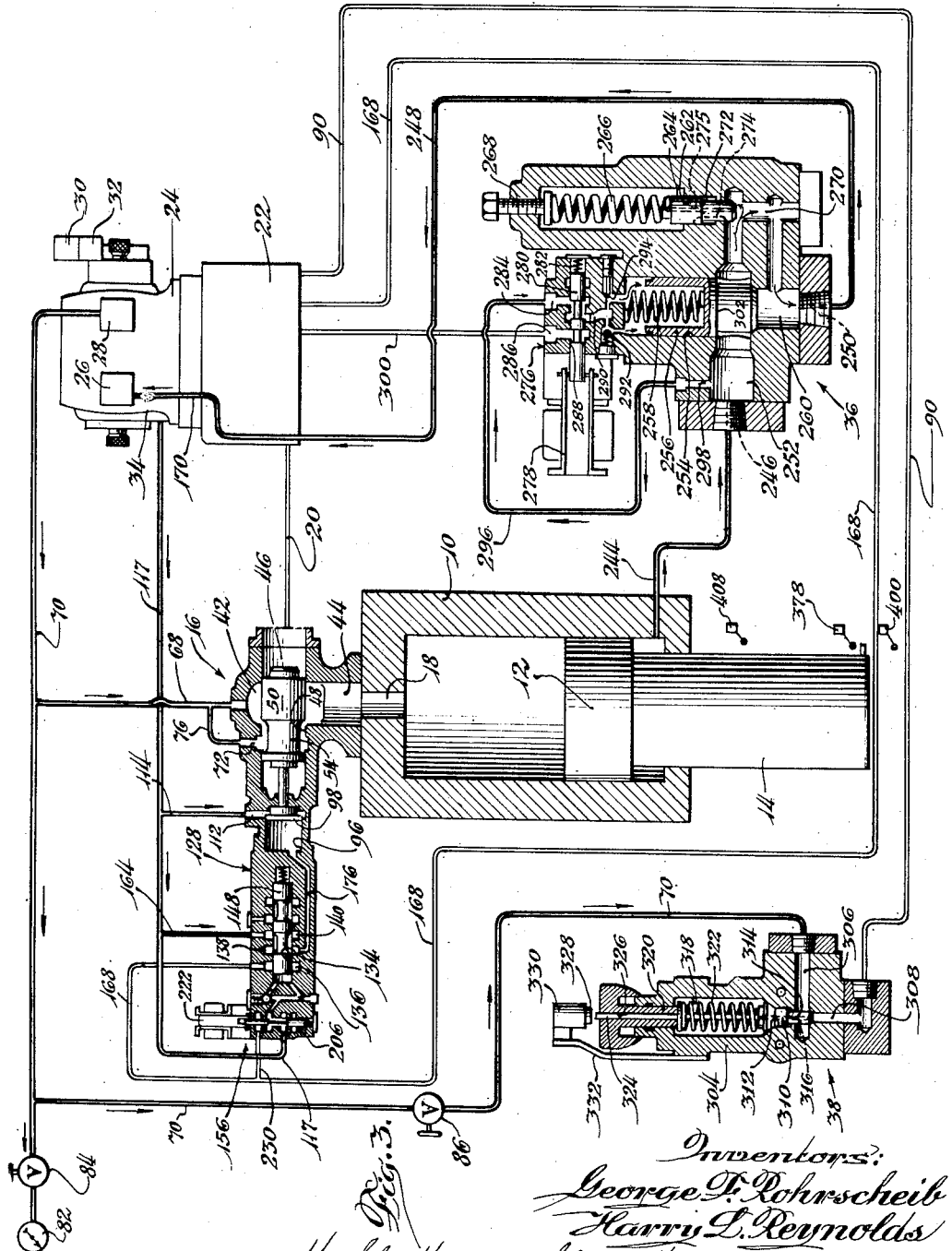

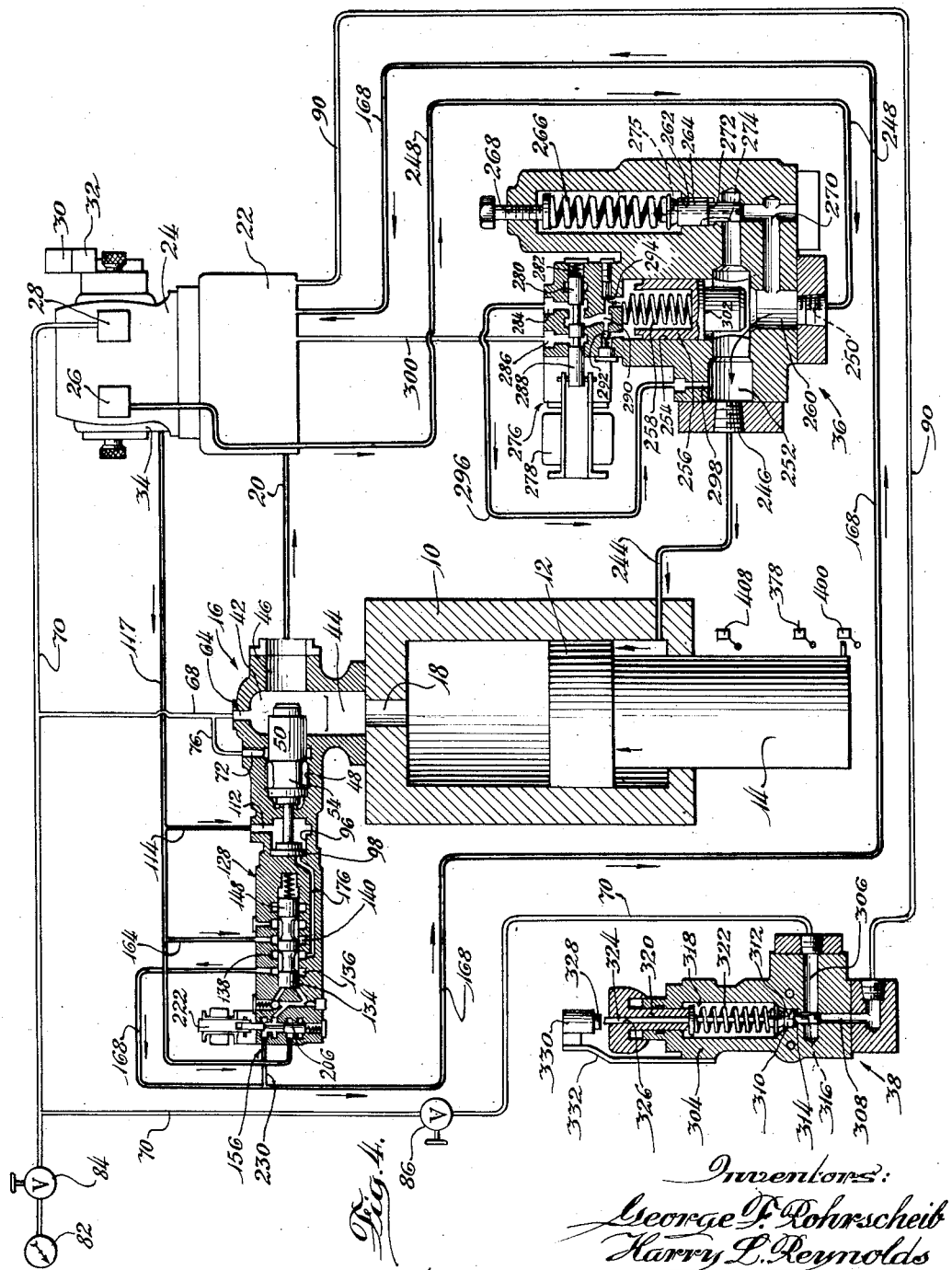

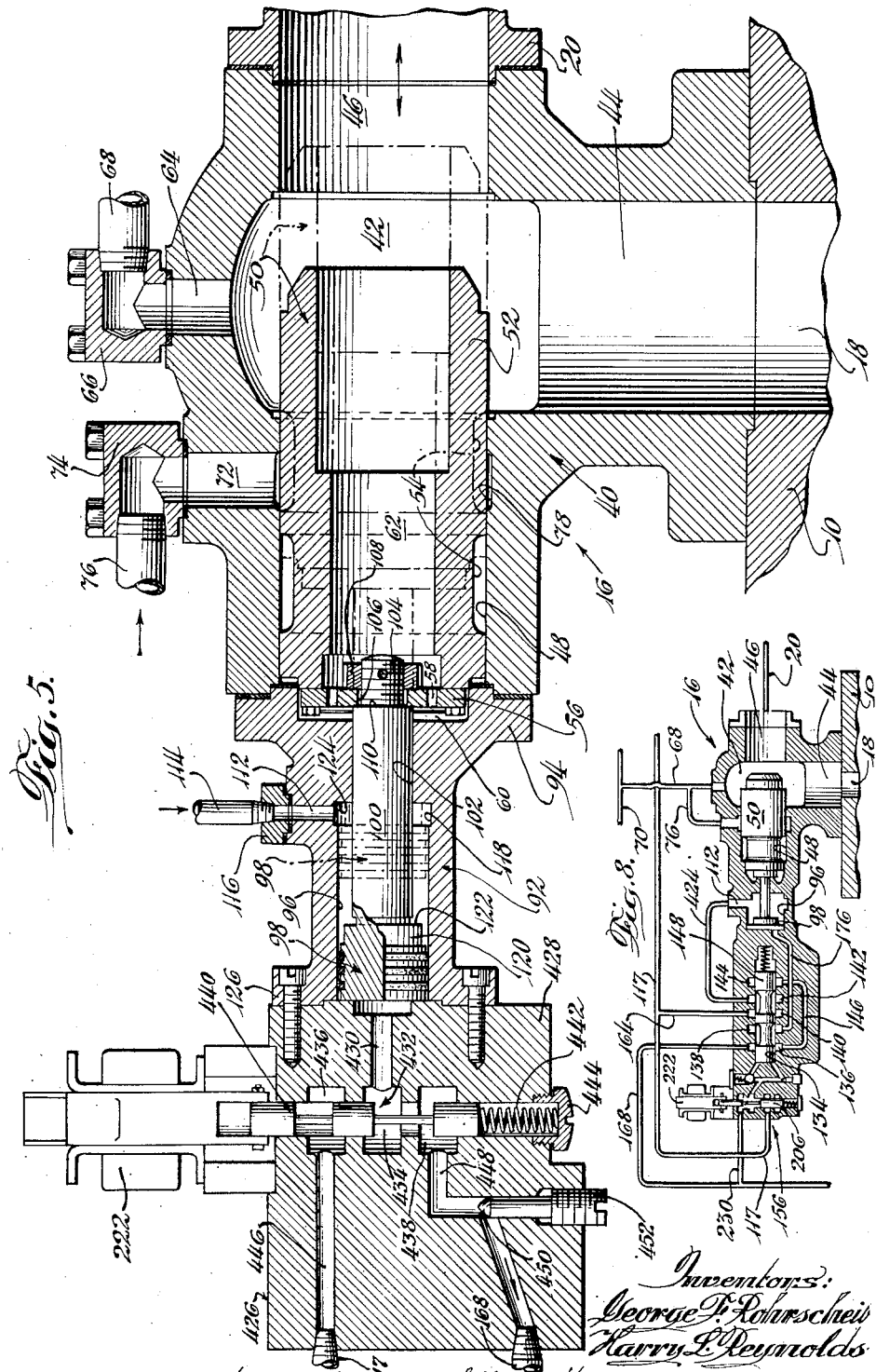

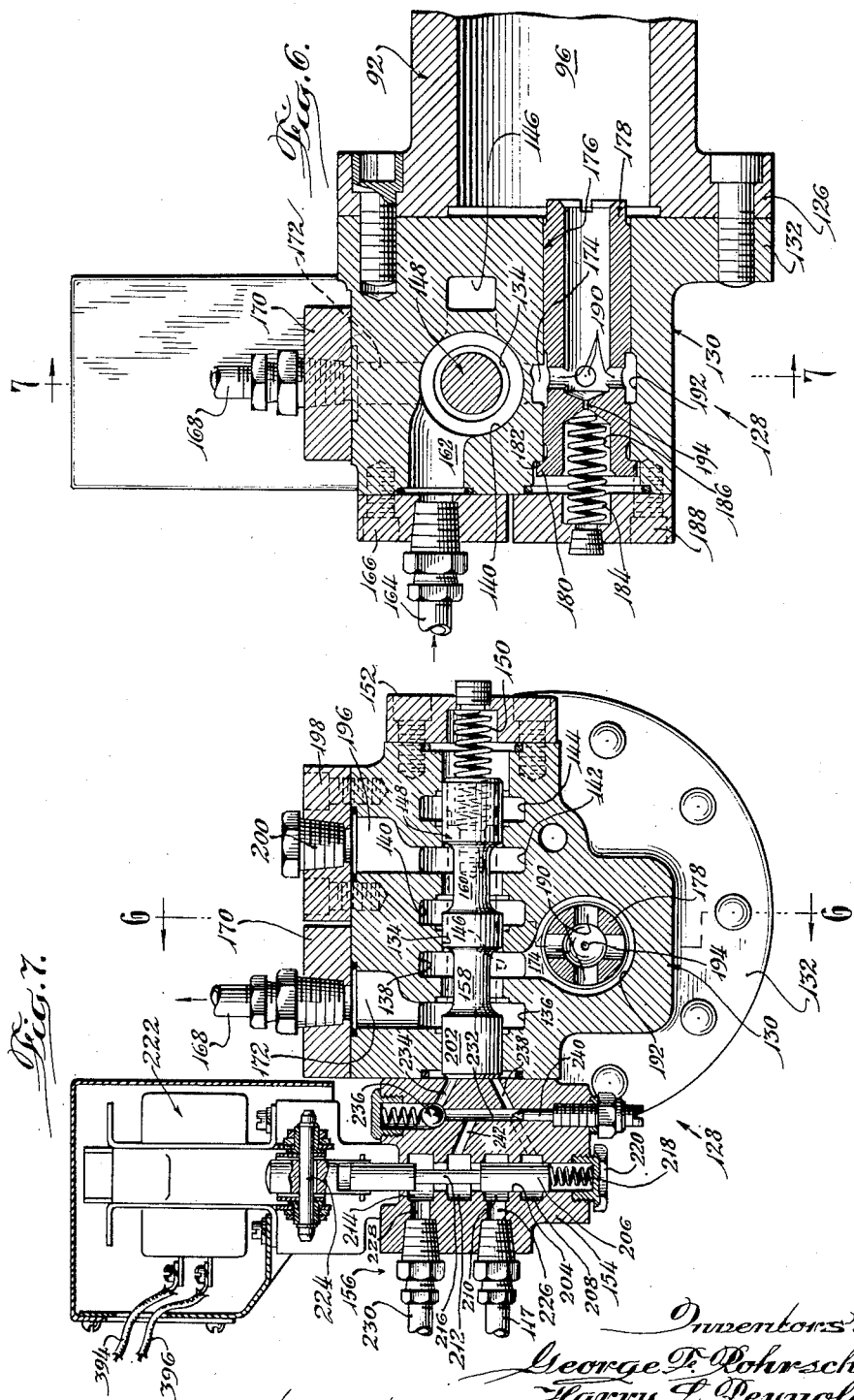

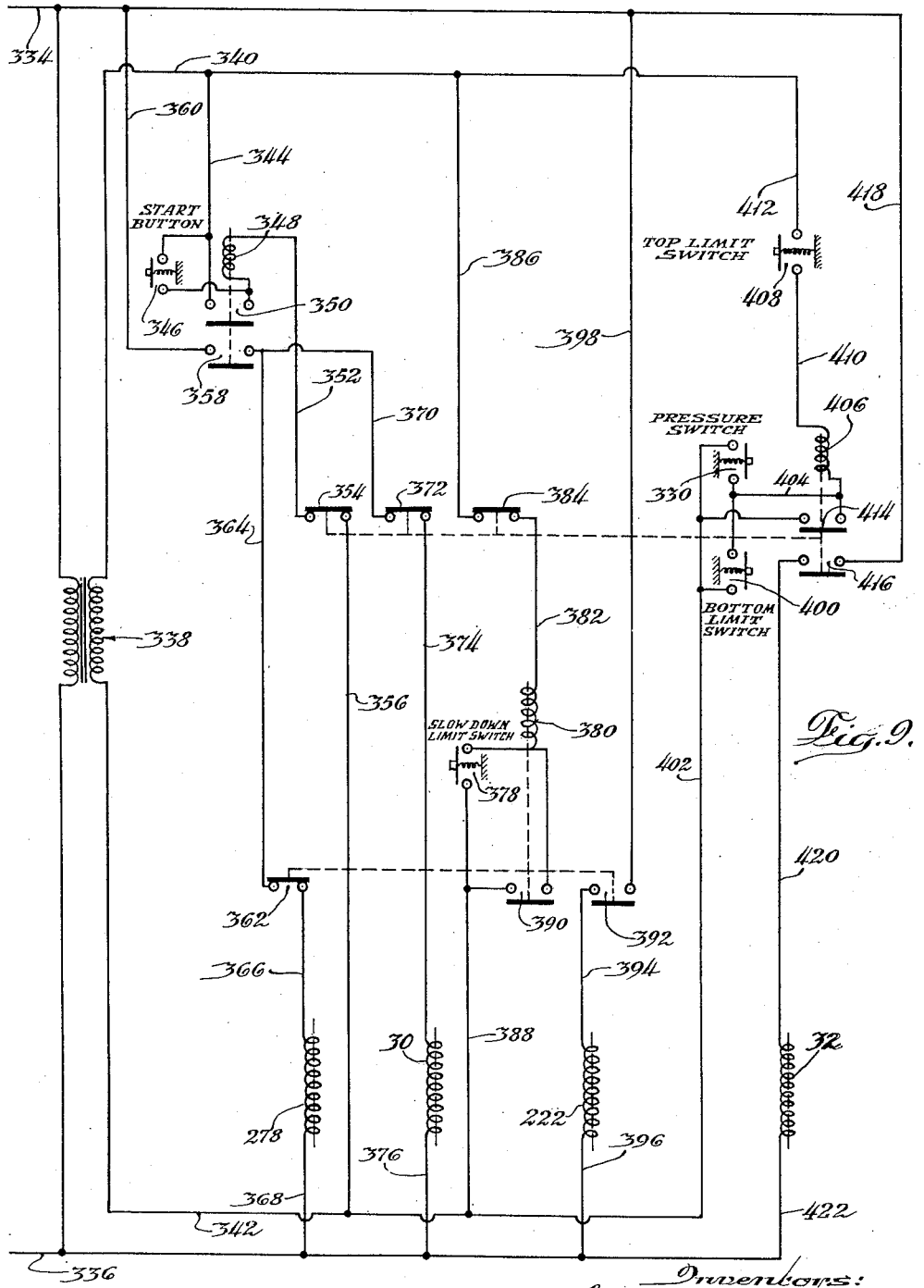

2,644,303

UNITED STATES PATENT OFFICE 2,644,303

HYDRAULIC PRESS CONTROL SYSTEM HAVING HYDRAULICALLY OPERATED MAIN VALVE

George F. Rohrscheib, Pewaukee, Wis., and Harry L. Reynolds, Chicago, Ill., assignors to Verson Allsteel Press Company, Chicago, Ill., a corporation of Delaware Application March 9, 1949, Serial No. 80,538

13 Claims. (Cl. 60—52)

1

The present invention relates to metal working presses, and in particular to an improved control system for a hydraulically operated press.

In hydraulic presses the advancing of the main or work slide or ram toward the press bed is normally accomplished in two stages. The first stage is generally known as the "rapid advance" stage and during it the main slide moves rapidly toward the press bed and expels fluid from the main cylinder or cylinders. During the rapid advance stage the speed of the slide is usually controlled or regulated. During the second stage—the "down pressing" stage—the operating fluid is supplied to the main cylinder or cylinders under pressure from a hydraulic pump to drive the slide or ram through the work portion of a complete cycle during which the dies draw and blank the work into the desired shape. After the work part of the cycle has been completed, the main cylinder is decompressed and fluid under pressure is supplied to the bottom portion of the main cylinder to restore the main slide or ram to its uppermost or rest position.

Decompressing the main cylinder and reversing the pump takes an appreciable amount of time compared to the entire time used in completing one cycle. For example, in a standard hydraulic press of one type now commonly manufactured by the assignee of this invention, a complete cycle takes 5.45 seconds. Decompression of the main cylinder and reversal of the pump takes 1.75 seconds or approximately 32% of the time required for a complete cycle. This invention is primarily concerned with the reduction in the amount of time required to make a complete cycle, and it is directed toward the reduction of the time required to decompress the main cylinder and effect a reversal in the direction of movement of the slide from downward to upward or, more generally from toward the work to away from the work.

It is, therefore, the primary object of the present invention to provide a novel hydraulic press control system wherein the time for making a complete work cycle is appreciably shorter than that in a conventionally controlled press.

Another object and advantage of the present invention is to provide a novel hydraulic control system attaining the immediately foregoing object which may be used on any conventional hydraulically operated press.

It is another object of the present invention to provide an improved hydraulic control system which is rapid and positive in its action.

Another object is to provide an improved control system attaining the foregoing objectives which contains no more component parts than conventional hydraulic systems and fewer parts than some of the systems.

Another object is to provide a novel hydraulic control system for a punch press which does not incorporate the customary and conventional valve mechanism used for piping the fluid to the main or surge valve to effect decompression of the main cylinder.

Another object is to provide a novel hydraulic control system for a punch or metal working press wherein the normal position for the main or surge valve provides for decompressed condition in the operating cylinder or cylinders and is biased toward this position constantly and in which the biasing force may immediately be overcome by a greater force the effect of which can rapidly be removed from operation.

A further object is to provide a novel hydraulic control system for a punch press which is smoother in operation than those in use prior to this invention and which, therefore, substantially eliminates the shock which usually accompanies slowing down the press at the end of the rapid advance and accompanies decompression of the hydraulic cylinders and reversal of the press through the operation of the surge valve.

Other objects and advantages will become apparent from the following description taken in conjunction with the accompanying drawings in which:

Fig. 1 is a diagrammatic view of a preferred form of the hydraulic control circuit of the present invention (and omitting all of the other press elements with the exception of the main cylinder, connecting rod and piston which are shown in schematic fashion) illustrating the control circuit elements in their rest position;

Fig. 2 is a diagrammatic view similar to Fig. 1 and illustrating the control circuit elements in their "rapid advance" position;

Fig. 3 is a diagrammatic view similar to Fig. 1 and illustrating the control circuit elements in their "down pressing" position;

Fig. 4 is a diagrammatic view similar to Fig. 1 and illustrating the control circuit elements in the position they assume during the return or upward stroke of the main slide;

Fig. 5 is a greatly enlarged medial cross-sectional view of the surge valve and showing a modified arrangement of the solenoid operated pilot valve;

Fig. 6 is a cross-sectional view taken substantially along the line 6—6 of Fig. 7 and on the longitudinal centerline of the surge valve and illustrating the connection to the control valve;

Fig. 7 is a cross-sectional view taken substantially along the line 7—7 of Fig. 6 and further illustrating the connections to the control valve and also illustrating the solenoid operated pilot valve;

Fig. 8 is a diagrammatic view showing a modified arrangement of the control valve for the surge valve; and Fig. 9 is a wiring diagram of a typical electrical circuit which may be used in conjunction with any of the modifications of the hydraulic control system of this invention.

Since the hydraulic control system of this invention can be used with any hydraulically actuated press, and since these presses are well known in the art and need not be described in detail herein, no description of the construction of such a press is included in this specification and only a single main cylinder and piston are shown in the drawings, it being understood that the system may incorporate two or more such cylinder-piston combinations.

For a better understanding of the present invention the hydraulic control circuit has been shown in four of its positions—one nonoperative and the other three operative. The flow of hydraulic fluid through the conduits of the system and the application of the hydraulic pressure are indicated by the arrows, and the heavier lines indicate which of the elements and conduits are active in the system at any particular time.

Referring primarily to Figs. 1 and 6, the hydraulic system is shown in conjunction with a main cylinder 10 having a piston 12 slidable therein. The piston 12 is secured to a connecting rod 14 which has its lower end secured to the main work slide or ram (not shown) to which the dies are secured. The cylinder 10 is connected to a main or surge valve 16 through a passageway or port 18, the valve 16 being shown mounted on the top of the cylinder 10. The valve 16 is connected by a relatively large diameter pipe or conduit 20 to a hydraulic fluid tank 22 which is maintained at atmospheric pressure. The tank 22 is in liquid supply relationship with a hydraulic pump 24 of the two directional delivery type.

The pump 24 is of the type driven by an electric motor and is adapted to pump fluid under pressure through one or the other of two outlets designated by the reference characters 26 and 28. The pump is constructed to be operated hydraulically and the valve for controlling the internal mechanism of the pump are operated by solenoids 30 and 32, the connections to which will be described hereinafter. The pump has built into it a small gear pump 34 which is driven continuously regardless of whether or not the pump 24 is pumping through either of its two outlets.

The pump 24 has three positions: The first is neutral wherein while it is being driven by the electric motor no fluid is pumped through either outlet 26 or 28; its second position is that in which it delivers fluid through the outlet 28; and its third position is that wherein it delivers fluid through the outlet 26. Regardless of which of these three positions the pump is in under control of the valves operated by the solenoids 30 and 32, fluid is being pumped from the gear pump 34 under a constant pressure which may be about 135 p. s. i. Pumps of this type are well known in the hydraulic press art and it is believed unnecessary to describe the pump 24 in greater detail or with more particularity.

Also included in the hydraulic circuit illustrated in Fig. 1 is a pilot operated hold-up valve indicated generally by the reference character 36 and a combined pressure relief or pressure reversal valve and switch operating mechanism 38.

Referring to Fig. 5 for a description of the construction of the surge valve 16, it is shown to comprise a central casting or body portion 40 having a central chamber 42. The central chamber 42 communicates with the port or passageway 18 from the cylinder 10 through a port or passageway 44. It also communicates with the large diameter conduit or pipe 20 through a passageway 46, the passageways 44 and 46 being substantially at right angles to each other. The passageway 46 is coaxial with a cylinder 48 wherein a piston type valve 50 is slidable.

The piston type valve comprises a tubular member 52 which has a circumferential groove 54 cut in its outer cylindrical surface adjacent the left end, as seen in Fig. 5, and in that portion of the piston valve 50 which slides in the cylinder 48. A cap 56 is bolted to one end of the member 52 at the closed end of the cylinder 48 and is provided with ports 58 through which the hydraulic fluid may flow in order to permit the piston 50 freely to slide in the cylinder. The space 60 at the closed end of the cylinder 48 communicates with the chamber 42 through the ports 58 and a central passageway 62 in the tubular valve member 52.

A main inlet port 64 is bored in the valve body 40 to communicate directly with the chamber 42. The port 64 is provided with a fitting 66 which is bolted or otherwise secured to the casting 40 and has a conduit 68 threaded therein. This conduit 68 is connected to conduit 70 which is in turn connected to the outlet port 28 of the pump 24 (Fig. 1).

Should it not be possible to supply an adequate quantity of fluid under pressure to the main cylinder 10 through the port 64 the surge valve is provided with an auxiliary port 72 having an inlet fitting 74 connected to a conduit 76 which is in turn connected either to the conduit 68 or directly to the conduit 70. It is seen from Fig. 5 that the port 72 communicates with a cylindrical groove 78 formed in the inner wall of the cylinder 48. Under normal conditions the port 72 would be plugged and, therefore, not used.

The valve 16 is shown in its rest or normal position with the port 72 closed from communication with the chamber 42 by the piston valve 50. During the down pressing portion of the cycle wherein pressure is to be exerted on top of the piston 12, the piston 50 is shifted to the right to the phantom line position shown in Fig. 5, and the annular groove 54 connects the annular groove 78 and port 72 with the chamber 42 (Fig. 3). This communication is, of course, immaterial if the port 72 is plugged. During the down pressing portion of a press cycle the pump 24 delivers fluid under pressure from the pump outlet 28 to the cylinder 10 through the conduits 70 and 68, fitting 66, port 64, chamber 42, port 44 and cylinder port 18. If the port 72 is connected for use fluid is additionally supplied through the conduits 76, fitting 74, port 72, grooves 54 and 78 and chamber 42.

A conventional pressure gauge 82 protected by a manually controlled shut off valve 84 is connected to the conduit 70.

The conduit 70 is connected through a manually controlled valve 86 with the inlet to the valve and switch operating mechanism 38. As will be explained hereinafter the valve 38 may be set for different pressures and a pressure in excess of the predetermined setting will be relieved and the fluid returned to the tank 22 through a conduit 90 connected to the outlet from the valve 38.

The cylinder 48 is closed by a generally cylindrically shaped cap 92 (Fig. 5) which has an attaching flange 94 by means of which it is secured in coaxial alignment with the cylinder 48. The cap 92 is bored to form a cylinder 96 in which a piston 98 is slidably mounted. The piston 98 has a connecting rod 100 which may be integral therewith and which passes through a bore 102 in the base of the cap 92 and into the cylinder 48. The projecting end 104 of the connecting rod 100 is threaded and is inserted through a hole or opening 106 in the cap 56 on the piston valve 50. A nut 108 holds the cap 56 against a shoulder 110 formed between the connecting rod 100 and its tapped end portion 104. Thus the piston 98, connecting rod 100 and valve piston 50 slide as a unit axially in the cylinders 48 and 96.

At its inner end the cylinder 96 communicates through a port or passageway 112 formed in the cap 92 with a conduit 114 secured to the cap 92 by a suitable fitting 116. The conduit 114 is connected through a conduit 117 (Fig. 1) to the gear pump 34 which has been previously described in conjunction with the description of the pump 24. Inasmuch as this gear pump is continuously driven during the operation of the press, pressure will be maintained in the cylinder 96 to bias the main valve 16 to the position shown in Fig. 5, the position corresponding to the decompressed condition of the main cylinder 10.

The passageway 112 communicates directly with a cylindrical groove 118 formed at the base or inner end of the cylinder 96. The piston 98 has a portion 120 of reduced cross-sectional area which forms a shoulder 122 with the connecting rod 100. This shoulder 122 abuts against the end wall 124 of the cylinder 96 when the piston 98 has been moved to its extreme inner position. This construction leaves a clearance or an annular space into which fluid may be delivered from the gear pump 34 even though the piston 98 may be at the inner or right end of the cylinder 96.

The cap 92 is provided with an integral flange 126 at its outer end opposite the flange 94, by means of which a control valve indicated generally by the reference character 128 is secured in operative relationship with the main valve 16.

The control valve 128, shown in detail in Figs. 6 and 7, includes a body casting 130 provided with a flange 132 by means of which the casting 130 is secured to the cap flange 126. The principal axis of the control valve is perpendicular to the axis of the cylinders 48 and 96 and not coaxial therewith as might be assumed from the diagrammatic representations in Figs. 1 to 4 and 8. A spool valve cylinder 134 is formed in the body casting 130 on its principal axis and communicates with a plurality of chambers 136, 138, 140, 142 and 144. Chamber 140 may be designated as the inlet chamber, chamber 136 as the drain chamber, and chamber 138 as the fluid transfer chamber. (The chambers 142 and 144 are not used in the embodiment of the control system shown in Figs. 1 to 4 but are used in that embodiment shown in Fig. 8 wherein the control valve 128 is connected as a four-way valve.) It will also be observed that the drain chamber 136 is connected to the chamber 144 by a cored passageway 146 (Fig. 8).

A spool valve 148, slidable in the cylinder 134, is biased to the left (Fig. 7) by a spring 150 having its inner end resting in a bore in the right end of the valve 148 and its outer end acting against a retaining plate 152 which is bolted to the valve body 130. Leftward movement of the valve 148 is limited by a casting 154 forming the body of a solenoid operated pilot valve 156. The valve 148 is provided with circumferential grooves or portions of reduced cross-section 158 and 160 so that different connections may be made between adjacent pairs of the chambers 136, 138, 140, 142 and 144 as will be explained more fully hereinafter.

An inlet passage 162 connects the conduit 164, which is secured to the casting 130 by a fitting plate 166, with the inlet chamber 140, the conduit 164 being connected to the gear pump 34 through the conduit 117.

The drain chamber 136 is connected to a conduit 168, which is secured to the valve body by a fitting plate 170, through a drain passage 172. The drain conduit 168 leads directly back to the tank 22 (Fig. 1).

The transfer chamber 138 communicates via port 174 with a transverse passage 176 formed in the body 130 and leading directly to the cylinder 96. A sleeve 178, slidable in the passage 176, is provided with a flange 180 at its outer end which normally engages a shoulder 182 at the end of the passage 176 opposite sleeve 96. The sleeve is biased against the shoulder by a spring 184 held in a recess 186 and acting against a retaining plate 188 which is suitably bolted to the casting 130. A set of ports 190 connect the interior of the sleeve with an annular groove 192 in the passage 176 which in turn communicates with the port 174. A small orifice 194 connects the bore 186 with the interior of the sleeve 178 and thus prevents any fluid pressure in the cylinder 96 from maintaining the sleeve 178 in its unbiased position or from moving toward the left as seen in Fig. 6.

As shown in Fig. 7, the chamber 142 is also provided with a passageway 196 which when the control valve 128 is connected as shown in Figs. 1 to 4 is plugged, but when the valve is connected as shown in Fig. 8 is used as will be hereinafter described. A fitting plate 198 corresponding to the plate 170 is provided for the passage 196 and a plug 200.

Fluid for operation of the control valve is supplied against the piston end 202 of the valve 148 by the previously mentioned solenoid operated pilot valve 156. The valve includes the cast body 154 which is preferably secured to the casting 130 by bolts (not shown). The valve body 154 is formed with a vertically arranged valve cylinder 204 in which is slidable a spool valve 206 controlling communication between the valve chambers 208, 210, 212 and 214. The spool valve 206 has a portion of reduced cross-sectional area 216 which permits fluid communication between adjacent pairs of the chambers 210, 212 and 214 according to its position. The valve member 206 is biased upwardly by a spring 218 held in position against the lower end of the member by a retainer 220.

A solenoid 222, mounted on the valve body 154 and provided with a movable armature connected to the valve member 206 at 224 moves the valve member downwardly against the spring 218. The pilot valve is shown in its normal or drain position with the chambers 212 and 214 in communication with each other. In its other position the valve member 206 will provide communication between the chambers 210 and 212.

The pilot valve has an inlet 226 connected to the conduit 117 leading from the gear pump and an outlet 228 connected to a conduit 230 which is in turn connected to the drain conduit 168. A passageway 232 is drilled in the valve body 154 parallel to the valve cylinder 204. At its upper end the passageway 232 is connected to the valve cylinder 134 by a cross passageway 234 closed by a spring pressed ball check valve 236. At its lower end the passageway 232 is connected to the valve cylinder 134 by a cross passageway 238 and past an adjustable restricting valve 240 of the needle type. A third cross passageway 242 is connected to the passageway 232 with the valve chamber 212.

When the valve elements are in the position shown in Fig. 7, any fluid which is in the valve cylinder 134 against the piston end 202 of the valve member 148 is expelled through the cross passageway 238, past needle valve 240, passageways 232 and 242, chambers 212 and 214, outlet 228, and conduits 230 and 168 to the tank 22. After the solenoid 222 has moved the valve member 206 to the position in which the chambers 210 and 212 are connected the fluid pressure created by the gear pump 34 will move the valve member 148 to the right (Fig. 7). The fluid flow from the gear pump is as follows: conduit 117, inlet 226, chambers 210 and 212, passageways 242 and 232, past needle valve 240, through passageway 238 and into the valve cylinder 134 against the piston end 202 of the valve member 148. The flow will also pass through check valve 236 and passageway 234 into valve cylinder 134.

Referring to Figs. 1 to 4, the lower end of the main cylinder 10 is connected by a conduit 244 to the pilot operated holdup valve 36 through the port 246. This valve is also connected by the conduit 248 from the port 250 to the outlet 26 from the pump 24.

The valve 36, schematically illustrated in Figs. 1 to 4, is shown as being formed with a valve body member having a cross passageway 252 leading from the port 246 and intersecting a vertically extending cylinder 254 in which is slidable a valve plunger 256 biased toward closed position by a spring 258. The valve 256 normally closes passageway 260 which interconnects the passage 252 and the outlet port 250.

Passageway 252 also intersects a cylinder 262 paralleling cylinder 254 and in which is slidable a valve plunger 264 which is biased toward closed position by a spring 266. The loading pressure which is exerted by the spring 266 may be adjusted by means of the adjusting screw 268. The valve plunger 264 normally closes an L-shaped passage 270 which leads to the passageway 260, so that under some circumstances if the valve 256 is closed communication may be established between the conduits 244 and 248 by opening the valve 264.

Valve plunger 264 is adapted to be opened under pressure in the passageway 252 and is formed with a shoulder 272 which divides the valve member 264 into two parts one having a somewhat larger diameter than the other so that fluid under pressure entering under and against the shoulder through a slot 274 formed in the cylindrical face of the valve 264 can overcome the biasing effect of the spring 266. In order that the fluid under pressure in the system not upset the normal operation of the valve 264 and so that it will remain in closed position when so intended a passage 275 is bored therethrough interconnecting the passage 270 with the spring chamber. Thus the only time that the valve 264 will be opened is when fluid under a predetermined pressure is in the passage 252 and the valve 256 is in closed position. Under these conditions the pressure applied against the shoulder 272 will raise the valve 264 to its open position against the loading effect of the spring 266.

The operation of the valve 256 is controlled by a solenoid operated pilot valve 276, the solenoid being designated by the reference character 278. The solenoid operates a valve spool 280 which is biased toward the left by a spring 282 and which interconnects either a pressure inlet port 284 or a drain outlet port 286 with the cylinder 254 in which the valve 256 is slideable. The valve spool 280 slides in a cylinder 288 which is connected to the ports 284 and 286, and a T-shaped passageway 290 connects the cylinder 288 with the valve cylinder 254 past a check valve 292 and a metering needle valve 294. The check and needle valves 292 and 294, respectively, control the ports from the passage 290 to the valve cylinder 254 allowing a free flow of fluid into the cylinder and a metered flow from the cylinder.

A conduit 296 having one end connected to a port 298 formed in the valve 36 and communicating with the cross passage 252 adjacent the port 246 leads to the pressure inlet port 284 of the pilot operated valve. The drain outlet port 286 is connected to the tank 22 by a conduit 300.

It will be noted from Figs. 1 to 4 that the valve plunger 256 has an upper hollow end of large diameter and a lower end of somewhat smaller diameter so that a shoulder 302 is presented to the passageway 252, the passageway at the point adjacent the lower end of the valve 256 being sufficiently large to provide communication therearound. The biasing spring 258 which is seated in the hollow upper end of the plunger 256 exerts only that amount of force which is normally required to maintain the valve firmly against its seat in the passageway 260. Thus, when any slight pressure is present in the passageway 252 which is not communicated to the upper end of the valve cylinder 254 through the conduit 296 and the pilot valve 276 the valve plunger will be moved upwardly to open communication between the passages 252 and 260.

In Fig. 1, it will be noted from the direction of the arrows, which indicate direction of application of pressure rather than actual flow of fluid, that pressure is being applied to both the top of the valve plunger 256 and also against the shoulder 302. It is applied to the top of the plunger from the passage 252 through the port 298, conduit 296, port 284, cylinder 288, passage 290, and past the opened check valve 292. It is applied to the shoulder 302 on the plunger 256 which faces the passage 252. Since the area over which the pressure is applied to the upper end of the plunger is greater than the area of the shoulder, the valve is held in closed position. When, however, the added pressure through the conduit 296 is removed and pressure is applied to the shoulder 302 of the valve plunger 256 (Fig. 2) or to the lower face of the valve from the passage 260 (Fig. 4) the valve will be moved to open position.

The pressure relief or pressure reversal valve and pressure operated switch mechanism 38 are also schematically illustrated in Figs. 1 to 4. This mechanism comprises a casting 304 having an inlet passageway 306 to which the conduit 70 is connected. Similarly, the conduit 90 is connected to an outlet passageway 308. The passageways 306 and 308 are at right angles to each other and the flow therebetween is controlled by a piston type valve 310. This valve is normally closed against a valve seat at the juncture of the passageways 306 and 308 and slides in a bore 312. The valve 310 comprises a lower portion having a diameter slightly larger than that of the outlet passage 310 and an integral upper portion of slightly larger diameter which slides in the bore 312. A shoulder 314 is formed between these two portions. A small diameter passageway 316 extends through the valve 310 and connects the outlet passageway 308 with a spring chamber 318 which has its upper end closed by a suitable cap having an adjustable member 320. A valve biasing spring 322 is retained between a pair of keepers arranged at opposite ends of the chamber 318; the spring keepers are carried by the valve 310 and the adjustable cap member 320.

A switch actuating rod 324 has one end seated in the valve 310 and its opposite end extends through a central opening 326 in the cap member 320 so as to engage an actuating element 328 of a switch 330. This switch 330 may be one or any number of different types, but in this particular installation it is a normally open single-pole switch (Fig. 6). The switch 330 is physically secured in operative position relative to the switch actuating rod 324 by a bracket 332 which is bolted or otherwise suitably secured to the casting 304. This bracket preferably is arranged so that the position of the switch 330 relative to the actuating rod 324 may be suitably adjusted. The pressure to which the spring 322 may be loaded is regulated by means of the adjustable cap member 320. As will appear hereinafter this pressure operated mechanism controls the maximum pressure which may be applied to the piston 12.

The electrical circuit which may be used in conjunction with the hydraulic system of this invention is shown in Fig. 9 and shown preferably as connected to a source of 440 volt alternating current. The circuit illustrated diagrammatically in Fig. 9 is merely typical and is of the type wherein the control switches and holding relays are in a circuit which is connected across the secondary of a step-down transformer, the primary of which is connected across the 440 volt source of alternating current. In this way the control circuit is safely operated at a low voltage while the operating solenoids 30, 32, 222 and 278 are operated by the higher voltage current.

The 440 volt source of current comprises a pair of lines 334, 336, which are connected to the terminals of the primary of a step-down transformer 338. One side of the secondary of the transformer 334 is connected to a conductor 340, and the other side is connected to a conductor 342.

Conductor 340 has connected to it a branch conductor 344 which is connected to a start switch 346 one terminal of which is in turn connected to a relay 348. The conductor 344 is also connected to one terminal of a switch 350 in the holding circuit for the relay 348, the other terminal of the switch 350 being connected to the start switch 346. The relay 348 is connected by conductor 352 to one terminal of a normally closed switch 354 which has its other terminal connected by conductor 356 to the conductor 342 leading back to the secondary of the transformer 338. When the start button is closed the relay 348 is energized and it closes a switch 358 which has one terminal connected by a conductor 360 to the line 334 and which has its other terminal connected to a switch 362 by a conductor 364. The switch 362 is in series with the solenoid 278 through a conductor 366 and the solenoid is in turn connected to the line 336 by a conductor 368. The switch 358 is also connected to a conductor 370 which is in series with a normally closed switch 372, a conductor 374, the solenoid 30 and a conductor 376, in that order, to the line 336.

Thus closing the start switch 346 energizes both the solenoids 278 and 30 which are in parallel with each other. The solenoid 278 is energized through the following circuit: line 334, conductor 360, switch 358, conductor 364, switch 362, conductor 366, solenoid 278, conductor 368 and line 336; the solenoid 30 is energized through the following circuit: line 334, conductor 360, switch 358, conductor 370, switch 372, conductor 374, solenoid 30 and conductor 376 to the line 336.

Pressing of the start button 346 and energizing the solenoids 30 and 278 commences the press operation, the initial stage of which is the rapid advance portion of the cycle. As the press ram approaches the press bed or the work it trips a slow down limit switch 378 which has one terminal connected to a relay 380. The relay 380 is in series via a conductor 382 with a normally closed switch 384 which is in turn connected to the conductor 340 by a conductor 386. The slow down limit switch 378 is also connected by a conductor 388 to the conductor 342. As soon as the switch 378 is closed the relay 380 is energized to close a switch 390 which is in parallel holding circuit with the slow down limit switch 378.

Closing of the switch 378 and energizing the relay 380 opens the switch 362 to break the circuit to the solenoid 278 and also closes a switch 392 which has one terminal connected by a conductor 394 to the solenoid 222 which is in turn connected by a conductor 396 to the line 336. The other terminal of switch 392 is connected by a conductor 398 to the line 334. Thus the effect of closing the slow down limit switch 378 by the movement of the press ram is to energize the solenoid 222 and to deenergize the solenoid 278. Energization of the solenoid 222 is effected through the following circuit: line 334, conductor 398, switch 392, conductor 394, solenoid winding 222, conductor 396 and line 336.

As the downward movement of the press cycle and the termination of the work portion thereof reaches its conclusion the press ram either trips a bottom position limit switch 400 or excess operating pressure actuates the previously mentioned and described pressure operated switch 330. These switches are connected in parallel each having one terminal connected by a conductor 402 to the conductor 342 and having its other terminal connected by a common conductor 404 to a relay 406. The relay 406 has its opposite end connected to top position limit switch 408 by a conductor 410, the top position limit switch being connected to the conductor 340 by the conductor 412. The relay 406 has a holding circuit including a switch 414 so that upon release of either the pressure switch 330 or the bottom limit switch 400, the relay 406 will continue to be energized. Energization of this relay 406 closes a switch 416 which has one terminal connected by the conductor 418 to the line 334 and its other terminal connected by the conductor 420 to one pole of the solenoid 32, the other pole of which is connected by conductor 422 to the line 336. Therefore, closing of either of the switches 330 and 400 completes the circuit through the relay 406 and energizes the following circuit for operation of the solenoid 32: line 334, conductor 418, switch 416, conductor 420, solenoid winding 32, conductor 422, and line 336.

It will be observed from Fig. 9 that simultaneously with the closure of the switches 414 and 416 all of the switches 354, 372 and 384 are opened. Consequently, the circuit to the solenoid 30 is broken permitting the pump 24 to reverse itself, and the circuit to the relay 380 is broken thereby permitting switch 362 to close and opening switches 390 and 392. Opening of the switch 392 will break the circuit to the solenoid 222 which then is deenergized. Closing of the switch 362 does not re-energize the solenoid 278 because opening the switch 354 breaks the circuit to the relay 348 and switch 358 opens. Since the opening of switch 354 is sequentially ahead of reclosing the switch 362, the circuit to the solenoid 278 will not be completed but only conditioned for a subsequent press cycle.

While the operation of the press control system might appear from the foregoing description of its component parts, it is believed advisable to include a description of the operation of this press so as to bring out more clearly in what manner it obtains the objects which are claimed for it in the opening paragraphs of this specification.

Referring first to Figs. 1, 6, 7 and 9, which show the component parts of the press in "rest" position with the start switch 346 open, the top limit switch 408 open, the slow-down limit switch 378 open, the bottom position limit switch 400 open and the pressure switch 330 open, the main valve 16 is in the position shown in Fig. 1 and the control valve 128 is as shown in Fig. 7.

The pump 24 is in its neutral position and when the press motor is started the gear pump 34 commences operation and delivers fluid through the conduits 117, 114 and 164 under a pressure of approximately 135 p. s. i. to hold the piston 98 toward the left as shown in Fig. 1 since the solenoid 222 is deenergized and the control valve supplies no fluid under pressure to the head of the piston 98. Under these conditions the valve member 50 establishes communication through the chamber 42 between the conduit 20 and the top of the main cylinder 10.

When the start button is pressed the circuit to the relay 348 is energized and the switches 350 and 358 are closed. Closing of the switch 358 energizes the circuits through the solenoids 278 and 30. The solenoid 278 actuates the valve 276 to move the spool valve member 280 to the right (Fig. 2) which cuts off communication between the conduit 244 and the top of valve cylinder 254 through the conduit 296. The top of the valve cylinder 254 is at this time connected through the pilot valve 276 with the tank 22 which is at atmospheric pressure. As the pressure acting downwardly on the valve 256 has been relieved and vented to atmospheric pressure and the fluid in the conduit 244 and passageway 252 is under the pressure exerted by the weight of the main slide, the valve 256 will be opened and fluid will be expelled from beneath the main piston 12 through the conduit 244, passageway 252, passageway 260, and conduit 248 to the pump 24 through the pump port 26. The fluid will be expelled through this circuit according to the volume setting of the pump, i. e., according to the rate at which the pump can take the fluid in and return it to the tank 22. This action of the pump regulates the speed at which the main slide advances toward the work.

Energization of the solenoid 30 shifts the pump 24 so that it pumps out through the port 28. And by the time the press cycle has reached that point wherein the drawing or blanking is to be done, substantial pressure will have been built up in the conduit system leading from the outlet 28.

As soon as the main slide moves away from its uppermost or "rest" position, the top position limit switch 408 closes to condition a portion of the electrical circuit for energization later in the press cycle.

This rapid advance will continue until the moving slide trips the slow-down limit switch 378 (Fig. 3). Tripping of the switch 378 closes the circuit through the relay 380 which opens the switch 362 and closes the switches 390 and 392. The circuit including the switch 362 and solenoid 278 is broken and the spring 282 moves the valve 280 so as to open communication between the port 284 and the valve cylinder 254. Fluid under pressure enters the valve cylinder 254 from beneath the piston 12 through the conduits 244 and 296. The cumulative pressure exerted by this fluid and the spring 258 closes the valve 256, and the rapid descent of the slide is checked (Fig. 3).

When the switch 378 is closed the circuit through the solenoid 222 is completed and the latter is energized to actuate the pilot valve 156 for the control valve 128 to connect the gear pump 34 with the left end of the cylinder 96. Energization of the solenoid 222 moves the valve member 206 downwardly (Fig. 7) to establish communication between the conduit 117 from the gear pump 34 and the valve cylinder 134 through the inlet 226, chambers 210 and 212 and the passageways 242, 232 and 238. Fluid under pressure moves the valve member 148 to the right against the spring 150 and establishes communication between the conduit 164—which is connected to the gear pump 34 through the conduit 117—and the cylinder 96 via the inlet 162, chambers 140 and 138, port 174, ports 190 and the sleeved passage 176.

Thus fluid under gear pump pressure is applied to the large end of the piston 96 as well as beneath the piston head. The pressure differential moves the piston 96 and the valve member 50 to the right to cut off free communication between the cylinder 10 and the tank 22 through the surge valve 16. The open check valve 236 and the passageways have a slight restricting effect on the fluid flow so that the valve member 148 does not move suddenly, and consequently the valve member 50 is not moved suddenly to its closed position.

The pump 24 is delivering fluid at a high pressure—e. g., 1200 p. s. i.—from the outlet 28 through the conduits 70 and 68 (and when necessary conduit 76) to the valve 16. This high pressure fluid passes through the valve 16 to the cylinder 10 and acts on the top of the piston 12 to drive the latter downwardly through the work portion of the press cycle. The fluid expelled from beneath the piston 12 holds the valve 256 in closed position and exerts a pressure against the valve plunger 264 to open it. The fluid expelled from the cylinder 10 is thus returned to the tank 22 through the conduit 248 and port 26 of the pump.

As the press ram reaches its lowest position the work portion of the cycle is completed. At this point the decompression of the main cylinder 10 and the reversal of the direction of movement of the piston 12 and the ram are accomplished either by actuation of the pressure responsive valve and switch actuating mechanism 38 to close the switch 330 or by tripping the bottom position limit switch 400. During the work portion of the cycle a portion of the fluid delivered from the port 28 is by-passed to the pressure responsive device 38. When this pressure builds up to exceed a predetermined value the valve 310 will be opened and the rod 324 will actuate the switch 330 to closed position. Fluid flowing through the device 38 will be returned to the tank 22 by the conduit 90.

Referring to Figs. 4 and 9, if either the bottom position limit switch 400 is tripped or the pressure switch 330 is closed, the circuit through the relay 406 is completed which closes the switches 414 and 416 and opens the switches 354, 372 and 384. Opening the switch 384 deenergizes the relay 380 which in turn allows the switch 392 to open. This breaks the circuit to the solenoid 222 allowing the spring 218 to move the valve spool 206 to the position shown in Fig. 7. Under these conditions the gear pump pressure is cut off from the left end of the cylinder 134 and the valve member 148 is moved to the left by the spring 150 expelling the fluid through the pilot valve 156 to the drain conduit 230. The control valve 128 is shifted gradually due to the metering effect of the pilot valve 156 —including the needle valve 240—and there will be no "slamming" of the valve member 148 to the position shown in Fig. 7. Therefore, communication between the valve chambers 138 and 136 is not fully established instantaneously. The movement of the valve member 148 is actually such that the fluid flow from the cylinder therepast and into the drain conduit 168 is regulated to prevent "slamming" the valve member 50 of the surge valve 16 to fully open position. The constantly applied pressure under the piston 98 shifts it and the valve member 50 to "open" position, and this pressure expels the fluid in the cylinder 96 through the control valve 128 and against the slightly restricting effect of this valve. However, the restricting effect of the valve 128 does not prevent a rapid decompression of the main cylinder, but prevents only a jarring of the press which would result from a violent and extremely rapid operation of the surge valve.

At substantially the same time as the solenoid 222 is deenergized, the switch 372 is opened and the switch 416 is closed, breaking the circuit to the solenoid 30 and completing the circuit through the solenoid 32, respectively. As soon as the solenoid 30 is deenergized, the pump 24 begins to shift toward neutral position. However, it does not remain in neutral position because the solenoid 32 is energized, and the pump 24 continues its internal shifting until it is pumping out from the port 26. It is to be noted, therefore, that the pump 24 shifts from pumping from the outlet 28 to pumping from the outlet 26 simultaneously with the decompression of the main cylinder rather than sequentially with this decompression.

It was stated that the relay 406 opened the normally closed switch 354. This is done to break the circuit to the relay 348 and to prevent reenergization of the solenoid 278.

The operation of the control system during the return stroke of the piston 12 is shown in Fig. 4.

The pump 24 is pumping out from the port 26 through the conduit 248 and into the passageway 260 in the valve 36. The pressure applied to the lower face of the valve plunger 256 moves it upwardly against the spring 258 expelling fluid from the valve cylinder 254 through the port 284 and conduit 286. The fluid from the pump 24 flows through the passageways 260 and 252 and conduit 244 to the underside of the piston 12 which moves upwardly expelling fluid from the upper end of the cylinder 10 through the valve 16 and conduit 20 to the tank 22.

When the press ram or main slide reaches its uppermost position it trips the top limit switch 408 to open the circuit to the relay 406 which opens the switch 416 to deenergize the solenoid 32 and otherwise restores the switches 414, 384, 372 and 354 to the positions shown in Fig. 9 to condition the system for subsequent operation. Deenergization of the solenoid 32 allows the internal valve mechanism of the pump 24 to shift the pump to its neutral position which likewise conditions the pump for a subsequent operating cycle.

It is, of course, within the skill of one versed in this art to provide the electrical circuit with other circuits for inching and continuous run types of operation.

In the foregoing description of a preferred form of the invention the control valve 128 for the surge valve 16 has been illustrated as a three-way valve. In the modification shown in Fig. 8 the control valve 128 is connected as a four-way valve. There is no direct connection between the gear pump 34 and the cylinder 96. Instead the biasing pressure is supplied through the valve 128 by a conduit 424 which has one end connected to the port 196 (shown as plugged in Fig. 7) and the other end connected to the port 112 to the cylinder 96.

Fluid for biasing the valve to the position shown in Fig. 8 is supplied from the gear pump 34 through the conduits 117 and 164, port 162, chambers 140 and 142, port 196, conduit 424, and port 112 to the cylinder 96. When the control valve 128 is actuated to supply fluid under pressure to shift the surge valve 16 to closed position, the valve member 148 is shifted to the right (Fig. 7) connecting the chambers 142 and 144 as well as the chambers 140 and 138. Fluid for moving the piston 96 and valve member 50 is supplied via the same route as previously described. The fluid from beneath the piston 96 is expelled through the port 112, conduit 424, port 196, chambers 142 and 144, cored passage 146, chamber 136, drain passage 172 and drain conduit 168.

The operation of the control system incorporating the four-way control valve 128 is substantially the same as that previously described.

Fig. 5 illustrates a further modification of a control valve for supplying fluid under gear pump pressure to the cylinder 96 to operate the valve member 50. In this modification control valve 426 is shown diagrammatically as a block 428 bolted to the flange 126 and having a number of passageways bored or formed therein. A passageway 430 connects the outer end of the cylinder 96 with a valve cylinder 432 which communicates with chambers 434, 436 and 438. A spool valve member 440 is slidable in the cylinder 432 and depending upon its position connects either the chambers 434 and 438 or the chambers 434 and 436. The valve member 440 is biased upwardly to a position wherein the chambers 434 and 438 are in communication with each other by a spring 442 held in position by a retainer 444 threaded into the valve block 428. The solenoid 222 is connected—when energized—to actuate the valve member 440 against the spring 442 to its other position.

An inlet passageway 446 connects the conduit 117 with the chamber 436. The chamber 438 is connected to a drain passageway 448, the flow through which is controlled by a needle valve 450 provided with an adjustment screw. The passageway 448 is connected by the drain conduit 168 to the tank 22.

The passageways through the valve block must be sufficiently large to pass a substantial quantity of fluid to and from the cylinder 96 in a short space of time, so that the valve 426 does not impose a retarding effect on the shifting of the valve 16 to closed or open positions.

It will be observed that the functions of the solenoid operated pilot valve 156 and the control valve 128 of the previous embodiments are incorporated into one valve in this form. However, this change does not alter the fundamental operation of the control system which was above described.

In the opening paragraphs it was stated that one typical press equipped with a conventional hydraulic control system had an operating cycle time of 5.45 seconds with 1.75 seconds devoted to decompressing the main cylinder and reversing the pump. The same size and type press equipped with the control circuit of the present invention has an operating cycle time of 4.45 seconds with only .75 second being devoted to decompressing the main cylinder and reversing the pump. While previously 32% of the cycle time was taken up with this operation, the present invention contemplates that only 16.8% of the time be used for reversal of the press. In fact the decompression and reversal depends upon how fast the pump 24 can be reversed as decompression of the cylinder is accomplished simultaneously therewith and in a very small space of time varying from .11 sec. to 1.1 sec. according to size of the surge valve.

It must be appreciated, therefore, that all of the objectives claimed for the system of this invention are attained.

It will be apparent to those skilled in the art that numerous changes and modifications may be made in this control system without departing from the spirit and scope of this invention. What is desired to be secured by United States Letters Patent, therefore, is:

1. A control system for a press having a cylinder and a piston reciprocable therein, comprising in combination, a source of fluid, a hydraulic pump adapted to deliver fluid under pressure for reciprocating the piston, a main valve through which fluid is supplied to the cylinder when the piston is moving in one direction, a first conduit connecting said pump to said valve, a second conduit connecting said source of fluid to said valve, pressure actuated means having a movable differential pressure piston connected to said main valve for operating the latter, a source of low pressure fluid to bias said differential pressure piston to hold said valve in one position so that the cylinder is connected to said source of fluid through said valve and said second conduit during one stage of movement of the piston in said one direction, and control means for said pressure actuated means to connect said low pressure fluid source to overcome the biasing pressure on said differential pressure piston thereby to move said valve to its second position to connect only said pump to the cylinder so that fluid under pressure is supplied to the cylinder through said valve and said first conduit during a second stage of movement of the piston in the same direction.

2. A control system for a press having a cylinder and a piston reciprocable therein, comprising in combination, a source of fluid, a hydraulic pump adapted to deliver fluid under pressure for reciprocating the piston, a main valve through which fluid is supplied to the cylinder when the piston is moving in one direction, said valve having a chamber therein through which fluid flows, a first conduit directly connecting said chamber with said source of fluid for the free flow of fluid to said chamber, a second conduit directly connecting said valve with an outlet from said pump, a valve member in said valve having two positions, one of said positions being such that said chamber is connected to said source of fluid and to said pump through both said conduits and the other of said positions being such that said chamber is connected only to said pump through said second conduit, pressure actuated means having a movable differential pressure piston connected to said valve member for moving the latter, a source of low pressure fluid to bias said differential pressure piston to hold said valve member in said first position so that the cylinder is connected to said source of fluid through said valve chamber and said second conduit during one stage of movement of the piston in said one direction, and control means for said pressure actuated means to connect said low pressure fluid source to overcome the biasing pressure on said differential pressure piston thereby to move said valve member to said second position to connect said pump to the cylinder so that fluid under pressure is supplied to the cylinder through said valve chamber and said first conduit during a second stage of movement of the piston in the same direction.

3. A control system for a press having a cylinder and a piston reciprocable therein, comprising in combination, a source of fluid, a hydraulic pump having a first outlet through which it delivers fluid under pressure to drive the piston in one direction, a main valve through which fluid is supplied to the cylinder when the piston is moving in said one direction, conduit means connecting said valve to said source of fluid and to said pump outlet, means including a second pump for biasing said valve to one position so that the cylinder is connected to said source of fluid through said valve during one stage of movement of the piston in said one direction, and means including said second pump for moving said valve to its second position against the force of said biasing means to connect only said first pump to the cylinder so that fluid under pressure is supplied to the cylinder through said valve during a second stage of movement of the piston in said one direction.

4. A control system for a press having a cylinder and a piston reciprocable therein, comprising in combination, a source of fluid, a hydraulic pump adapted to deliver fluid under pressure for reciprocating the piston, a main valve through which fluid is supplied to the cylinder when the piston is moving in one direction, conduit means connecting said valve directly to said source of fluid and to said pump, pressure actuated means having a movable differential pressure piston connected to said main valve for operating the latter, a source of low pressure fluid to bias said differential pressure piston to hold said valve in one position so that the cylinder is connected to said source of fluid through said valve during one stage of movement of the piston in said one direction control means for said pressure actuated means to connect said low pressure fluid source to overcome the biasing pressure on said differential pressure piston thereby to move said valve to its second position to connect only said pump to the cylinder so that fluid under pressure is supplied to the cylinder through said valve during a second stage of movement of the piston in the same direction, means connecting said pump to the cylinder to supply fluid under pressure to the cylinder to move the piston in the other direction, and means for rendering said control means ineffective and simultaneously causing said last mentioned means to restore the piston to its initial position, the biasing pressure on said differential pressure piston simultaneously returning said valve to said first position whereby fluid may be expelled from the cylinder and returned to said source of fluid through said valve.

5. A control system for a press having a cylinder and a piston reciprocable therein, comprising in combination, a source of fluid, a hydraulic pump adapted to deliver fluid under pressure for reciprocating the piston, a main valve through which fluid is supplied to the cylinder when the piston is moving in one direction and through which fluid is expelled from the cylinder when the piston is moved in the other direction, conduit means connecting said valve directly to said source of fluid and to an outlet from said pump, pressure actuated means having a movable differential pressure piston connected to said main valve for operating the latter, a source of low pressure fluid to bias said differential pressure piston to hold said valve to one position so that the cylinder is connected to said source of fluid through said valve during a portion of movement of the piston in one direction and during movement of the piston in the second direction, control means for said pressure actuated means to connect said low pressure fluid source to overcome the biasing pressure on said differential pressure piston thereby to move said valve to its second position to connect only said pump to the cylinder through said main valve and to move the piston under pressure through a second stage of said first direction of movement, means for relieving said valve from the force moving it to its second position when the piston has completed its movement in said first direction, and means operating simultaneously with said last mentioned means for connecting said pump to the cylinder for moving the piston through its second direction of movement, the biasing pressure on said differential pressure piston simultaneously moving said valve to its first position.

6. A control system for a hydraulically operated press having a cylinder, a piston reciprocable therein, and a source of fluid, including in combination, a main hydraulic pump adapted to deliver fluid under pressure for reciprocating the piston, a main valve controlling the flow of fluid to and from the cylinder on one side of the piston, a conduit connecting said main valve to the source of fluid, a second conduit connecting said main valve to said pump, means including a second pump for biasing said main valve so that the cylinder is connected to the source of fluid through said valve, a control valve, said control valve being connected to said second pump and being also connected to deliver fluid under pressure from said second pump against the biasing pressure, means controlled in synchronism with the movement of the piston for operating said control valve to connect said second pump to overcome the biasing pressure and to move said main valve to its second position thereby connecting said main hydraulic pump to move the piston under pressure in the first direction, a hold up valve connected to the cylinder and to said pump, said hold up valve regulating the rate of fluid flow from said cylinder when the piston is moving in one direction thereby to regulate the speed of movement of the piston in said one direction, and a pilot valve for said hold up valve operable to connect the cylinder with said main hydraulic pump for fluid flow in one direction during one stage of piston movement and to connect the cylinder with said main hydraulic pump for fluid flow in the opposite direction to restore the piston to its initial position.

7. A control system for a hydraulically operated press having a cylinder, a piston reciprocable therein, and a source of fluid, including in combination, a main hydraulic pump adapted to deliver fluid under pressure for reciprocating the piston, a main valve controlling the flow of fluid to and from the cylinder on one side of the piston, a conduit connecting said main valve to the source of fluid, a second conduit connecting said main valve to said pump, means including a second pump for biasing said main valve so that the cylinder is connected to the source of fluid through said valve, a control valve, said control valve being connected to said second pump and connected to deliver fluid under pressure from said second pump against the biasing pressure, means controlled in synchronism with the movement of the piston for operating said control valve to connect said second pump to overcome the biasing pressure thereby to move said main valve to its second position connecting said main hydraulic pump to move the piston under pressure in the first direction, a hold up valve connected to the cylinder for controlling the rate of flow of fluid to and from the cylinder on the other side of the piston to regulate the speed of movement of the piston in one direction, and means operating said last mentioned valve to connect the cylinder with said main hydraulic pump for fluid flow in one direction during one stage of piston movement and to connect the cylinder with said main hydraulic pump for fluid flow in the opposite direction to restore the piston to its initial position, said last mentioned means including means for disconnecting said biasing pressure overcoming means.

8. A control system for a hydraulically operated press having a cylinder, a piston reciprocable therein, the cylinder having a port on one side of the piston and a second port on the other side of the piston through which the operating fluid is passed, and a source of fluid, including in combination, a main hydraulic pump adapted to deliver fluid under pressure for reciprocating the piston, a main valve controlling the flow of fluid through the first cylinder port, a conduit connecting said main valve to the source of fluid, a second conduit connecting said main valve to said pump, pressure actuated means having a movable differential area piston connected to said main valve for operating the latter, a source of low pressure fluid to bias said differential area piston to hold said main valve in such position that the cylinder is connected to the source of fluid through said main valve, a control valve for said pressure actuated means, means operated in synchronism with the movement of the piston for operating said control valve to connect said low pressure fluid source to overcome the biasing pressure and to move said main valve to its second position thereby connecting said main pump to the cylinder through the first port to move the piston under pressure in the first direction, a valve connected to the second cylinder port for controlling the rate of flow of fluid therethrough to regulate the speed of movement of the piston in one direction, means operating said last mentioned valve to connect the cylinder through the second port with said main pump for fluid flow in one direction during one stage of movement of the piston and to connect the cylinder through the second port with said main pump for fluid flow in the opposite direction to restore the piston to its initial position.

9. A control system for a hydraulically operated press having a cylinder, a piston reciprocable therein, the cylinder having a port on one side of the piston and a second port on the other side of the piston through which the operating fluid is passed, and a source of fluid, including in combination, a main hydraulic pump adapted to deliver fluid under pressure for reciprocating the piston, a main valve controlling the flow of fluid through the first cylinder port, a conduit connecting said main valve to the source of fluid, a second conduit connecting said main valve to said pump, means including a second pump biasing said main valve so that the cylinder is connected to the source of fluid through said valve, a control valve, means including said second pump controlled in synchronism with the movement of the piston for operating said control valve to connect said second pump to overcome the biasing pressure and to move said main valve to its second position thereby connecting said main hydraulic pump to the cylinder through the first port to move the piston under pressure in the first direction, a valve connected to the second cylinder port for controlling the rate of flow of fluid therethrough to regulate the speed of movement of the piston in one direction, a conduit connecting said last mentioned valve to said main hydraulic pump, means operating said last mentioned valve to connect the cylinder through the second port with said main hydraulic pump for fluid flow in one direction during one stage of movement of the piston and to connect the cylinder through the second port with said main hydraulic pump for fluid flow in the opposite direction to restore the piston to its initial position, said last mentioned means including means for disconnecting said biasing pressure overcoming means.

10. A hydraulic control system for a press having a cylinder and a piston reciprocable therein, comprising in combination, a source of fluid, a main hydraulic pump of the two directional delivery type having two delivery ports, said pump being adapted to deliver fluid under high pressure for reciprocating the piston, a main valve adapted to connect the cylinder on one side of the piston at one time with said source of fluid and at another time with one of said delivery ports only and through which fluid is delivered to said cylinder when the piston is moved in one direction, a low pressure pump, pressure operated means connected to receive fluid from said low pressure pump for biasing said main valve to a first position wherein the cylinder is connected to said source of fluid through said valve, means synchronized with the movement of the piston for connecting said low pressure pump to said pressure operated means to overcome the biasing pressure to move said valve to a second position thereby to connect said one delivery port only to the cylinder through said valve, and second means synchronized with the movement of the piston for simultaneously actuating said main hydraulic pump to pump fluid out through the second delivery port and for deenergizing said first mentioned synchronized means, whereby said pressure operated means returns said valve to said first position to effect decompression of the cylinder.

11. A control system for a press having a cylinder and a piston reciprocable therein, comprising in combination, a source of fluid, a hydraulic pump adapted to deliver fluid under pressure for reciprocating the piston, a valve mechanism controlling the flow of fluid to and from one end of the cylinder, said valve mechanism comprising a valve body having a chamber formed therein, a valve cylinder formed in said valve body communicating with said chamber, a pair of relatively large passageways formed in said valve body and communicating with said chamber, one of said passageways communicating directly with the first mentioned cylinder and the other of said passageways being connected by conduit means directly with said source of fluid, a piston-type valve member slidable in said cylinder and arranged when in one position to permit communication between said passageways through said chamber and when in a second position to prevent communication between said passageways, a high pressure inlet port in said valve body communicating with said chamber, a conduit connecting said high pressure inlet port with said hydraulic pump, a second cylinder forming means, a piston slidable in said second cylinder, means interconnecting said second piston and said valve member, a low pressure inlet port through which fluid pressure is applied against said second piston to bias said valve member to said first position, a second pressure inlet in said second cylinder forming means through which fluid pressure is applied against said piston to overcome the biasing pressure to move said valve member to its said second position, and means synchronized to the movement of the first mentioned piston for controlling the flow of fluid through said last mentioned inlet.

12. A control system for a press having a cylinder and a piston reciprocable therein, comprising in combination, a source of fluid, a hydraulic pump adapted to deliver fluid under pressure for reciprocating the piston, a valve mechanism controlling the flow of fluid to and from one end of the cylinder, said valve mechanism comprising a valve body having a chamber formed therein, a valve cylinder formed in said valve body communicating with said chamber, a pair of relatively large passageways formed in said valve body and communicating with said chamber, one of said passageways communicating directly with the first mentioned cylinder and the other of said passageways being connected by conduit means directly with said source of fluid, a piston type valve member slidable in said cylinder and arranged when in one position to permit communication between said passageways through said chamber and when in a second position to prevent communication between said passageways, a high pressure inlet port in said valve body communicating with said chamber, a conduit connecting said high pressure inlet port with said hydraulic pump, a second cylinder forming means, a piston slidable in said second cylinder, means interconnecting said second piston and said valve member, a low pressure inlet port through which fluid pressure is applied against said second piston to bias said valve member to said first position, a second pressure inlet in said second cylinder forming means through which fluid pressure is applied against said piston to overcome the biasing pressure to move said valve member to its second position, and a valve controlled by the movement of the first mentioned piston for controlling the flow of fluid through said last mentioned inlet.

13. A control system for a press having a cylinder piston reciprocable therein, comprising in combination, a source of fluid, a hydraulic pump adapted to deliver fluid under pressure for reciprocating the piston, a valve mechanism controlling the flow of fluid to and from one end of the cylinder, said valve mechanism comprising a valve body having a chamber formed therein, a valve cylinder formed in said valve body communicating with said chamber, a pair of relatively large passageways formed in said valve body and communicating with said chamber, one of said passageways communicating directly with the first mentioned cylinder and the other of said passageways being connected by conduit means directly with said source of fluid, a piston type valve member slidable in said cylinder and arranged when in one position to permit communication between said passageways through said chamber and when in a second position to prevent communication between said passageways, a high pressure inlet port in said valve body communicating with said chamber, a conduit connecting said high pressure inlet port with said hydraulic pump, a second cylinder forming means, a piston slidable in said second cylinder, means interconnecting said second piston and said valve member, a low pressure inlet port through which fluid pressure is applied against the underside of said piston to bias said valve member to said first position, a second pressure inlet in said second cylinder forming means through which fluid pressure is applied against the head of said piston to overcome the biasing pressure to move said valve member to its said second position, a source of fluid under low pressure connected to said low pressure inlet port, and means synchronized to the movement of the piston and connected to said source of low pressure for controlling the flow of fluid through said last mentioned inlet.

GEORGE F. ROHRSCHEIB.
HARRY L. REYNOLDS.

References Cited in the file of this patent

UNITED STATES PATENTS

| Number | Name | Date |
|---|---|---|
| 1,616,841 | Beebe | Feb. 8, 1927 |
| 1,900,229 | Dennis | Mar. 7, 1933 |
| 2,041,726 | Pray | May 26, 1936 |
| 2,189,858 | Dinzl | Feb. 13, 1940 |
| 2,244,373 | Powers | June 3, 1941 |
| 2,267,177 | Twyman | Dec. 23, 1941 |
| 2,307,544 | Robinson | Jan. 5, 1943 |
| 2,324,697 | Harrington et al. | July 20, 1943 |
| 2,357,019 | Nowak et al. | Aug. 29, 1944 |
| 2,368,769 | Muller | Feb. 6, 1945 |
| 2,380,153 | Davis | July 10, 1945 |
| 2,423,120 | Sedgwick | July 1, 1947 |
| 2,473,676 | Camerota | June 21, 1949 |
| 2,539,361 | Cannon | Jan. 23, 1951 |

FOREIGN PATENTS

| Number | Country | Date |
|---|---|---|
| 512,010 | Great Britain | Aug. 28, 1939 |